March 17, 1964 — J. MACHLIS — 3,125,716
ANALOG MEASURING SYSTEM
Filed July 5, 1961 — 2 Sheets-Sheet 1
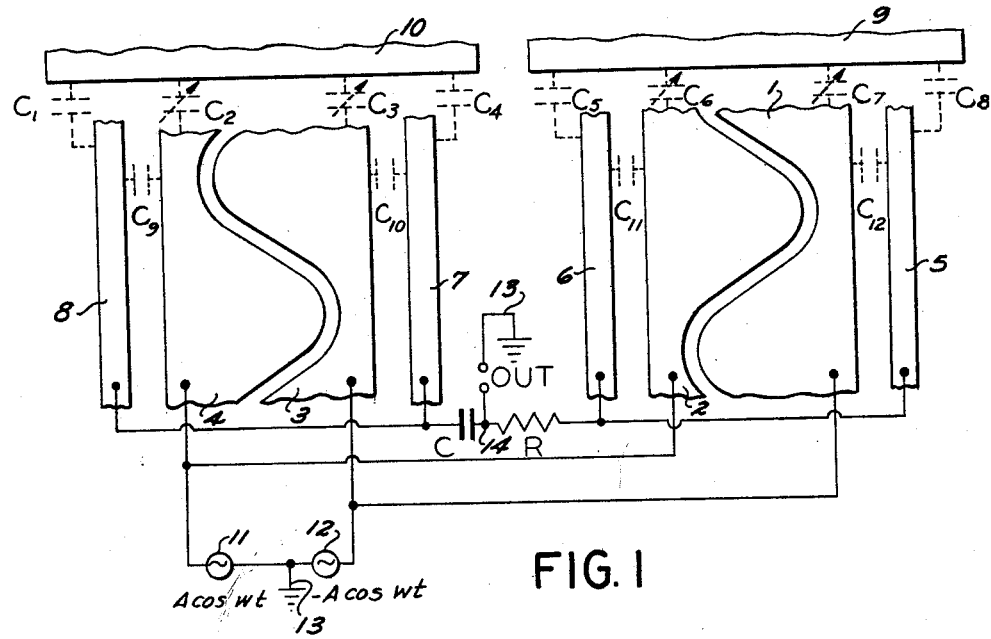
FIG. 1
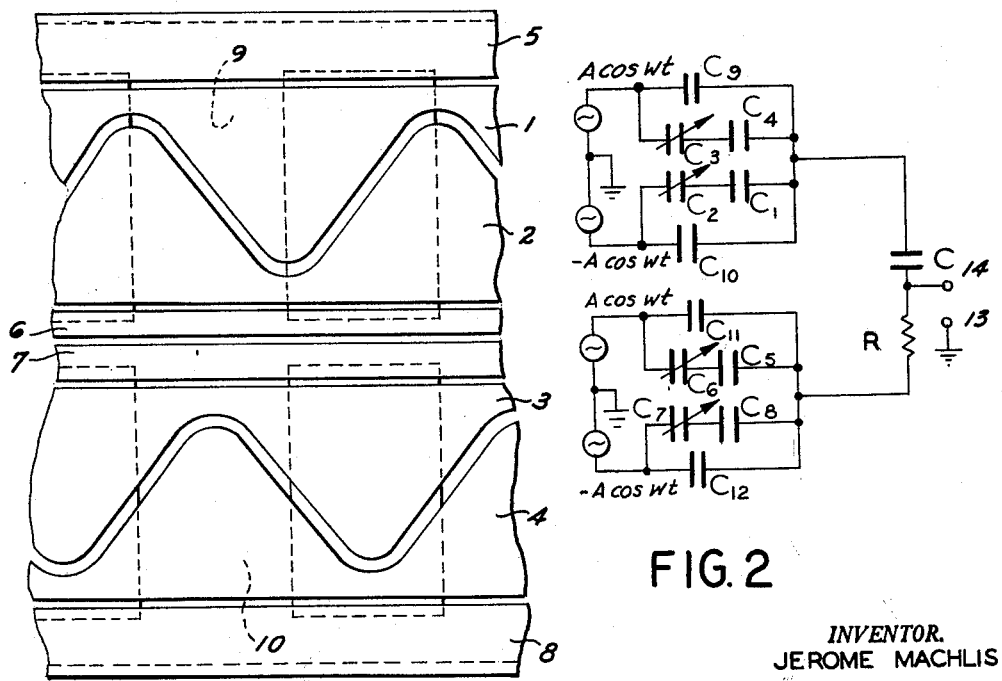
FIG. 3
FIG. 2
INVENTOR.
JEROME MACHLIS
BY
ATTORNEY March 17, 1964  J. MACHLIS  3,125,716
ANALOG MEASURING SYSTEM
Filed July 5, 1961  2 Sheets-Sheet 2

INVENTOR.
JEROME MACHLIS
BY
R.E. Geangue
ATTORNEY

United States Patent Office

3,125,716
Patented Mar. 17, 1964

3,125,716
ANALOG MEASURING SYSTEM
Jerome Machlis, Granada Hills, Calif., assignor to Telecomputing Corporation, Hollywood, Calif., a corporation of California
Filed July 5, 1961, Ser. No. 121,852
6 Claims. (Cl. 323—122)

This invention relates to a high accuracy analog measuring system and to apparatus therefor which converts small mechanical motions into large electrical phase shift signals which may be digitized to provide high accuracy and high resolution readout.

There is disclosed in Patent No. 3,068,457 entitled Displacement Measuring Device, and Patent No. 3,068,456 entitled Resolver Digitizing System, both of which are assigned to the assignee of the present application, a resolver and an electronic circuitry therefor which provide for ultra-precise measurement of displacement, utilizing phase-domain techniques. The resolver of the first-mentioned application is essentially a highly accurate electrostatic phase shifter. It may be adapted to either a rectilinear or a rotary embodiment. It employs two sets of conjugate sinusoidal conductive patterns which are phase displaced by 90 degrees. On either side and between the sets of patterns are output conductors which are electrically connected to furnish the output signal to the related electronic circuitry. A relatively movable coupler element transfers an excitation signal from the sinusoidal patterns to the coupler conductors. This pattern configuration provides an output signal having constant amplitude and an electrical phase angle, referenced to the input signal, which is proportional to the position of the coupler element. A more detailed discussion of this prior resolver apparatus may be found in the specification which follows and also may be found in the aforementioned patents.

In the present invention there is contemplated a simplification and improvement of the basic system of the prior resolver apparatus in which only a single pair of sinusoidal patterns and a pair of interleaved coupler elements on the relatively movable element are employed. This will provide not only a simplification of the apparatus but will also permit a substantial reduction in its size. The electrical output obtained is substantially the same as that obtained from the dual pattern resolvers previously described. Also, the use of a single pair of conjugate sinusoidal patterns permits a simplification in the A.-C. excitation or driver circuitry used to provide the sine and cosine or quadrature signals.

The apparatus of the present invention further differs from that disclosed in the above-mentioned patents in that the applied driving signals comprise A.-C. signals which have a 0 and 180 degree time relationship, rather than a 0, 90, 180, 270 degree (quadrature) time relationship. A post-pickup phase shifting circuit is employed to result in phase quadrature signals as may be required by related utilization circuits. The substantial reduction in the physical complexity of the resolver and the simplification of the driver circuitry significantly reduces the probability of physical error in the manufactured transducers as well as materially reducing the overall cost of the apparatus.

As in the case of the prior system, the present system consists of two main units: the transducer or sensing device attached to the element whose displacement is to be measured, and the associated electronic circuitry. In a rotary embodiment, there is employed a pair of dimensionally stable non-conducting discs, mounted facing each other in closely spaced relationship, one of which is relatively movable with respect to the other. Each disc carries a pattern of conducting metal film; the relatively stationary pattern being the driver and the relatively movable pattern being the coupler. Both the input and the output connections are made to the stationary disc. The coupler pattern couples energy electrostatically from the driver pattern to output conductor rings from which it is transferred to the utilization circuit load. Since there are no direct electrical connections to the coupler disc, it is attached to the element whose rotation is to be measured while the driver disc is fixed to the stationary supporting frame.

The improved apparatus of the present invention retains all of the benefits of the prior apparatus. For example, the use of both cosine and sine pattern pairs on the same disc may be extended to the present invention to provide a highly accurate, non-ambiguous readout of angular position. Also, the symmetry in the arrangement of the pattern pairs and the coupler bars results in an averaging of the output of all pattern pairs. This averaging effect prevents errors from being introduced because of non-linear pattern pair or eccentricities of the rotation centers of the driver and coupler discs.

It is therefore a primary object and purpose of the invention to provide measuring transducers of the general type described hereinabove but of simplified construction yet retaining the advantages of such prior instruments.

It is another object of the invention to provide an improved analog measuring system for electrically measuring angular and linear mechanical displacements to a high degree of accuracy.

It is another object of the invention to provide novel and improved electrical phase shifting apparatus having a simplified excitation circuit for providing a 0 and 180 degree electrical input, and which provides phase quadrature electrical outputs, wherein the electrical output signals are phase modulated with respect to the input reference signals and wherein said phase modulation is a linear function of mechanical displacement.

It is also an object of the invention to provide novel and improved phase shifting transducer apparatus of the electrostatic type having improved construction and simplified circuitry.

These and other objects, features and advantages of the invention will become more fully apparent by reference to the appended claims and the following detailed description, when read in conjunction with the accompanying drawings, wherein:

FIGURE 1 is a diagrammatic representation of one embodiment of the invention showing a portion of the rotor and stator conductor patterns and the related circuit components.

FIGURE 2 is an equivalent circuit of the apparatus of FIGURE 1.

FIGURE 3 is a simplified plan view of a portion of the stator pattern and an overlying coupler bar.

Figure 5:
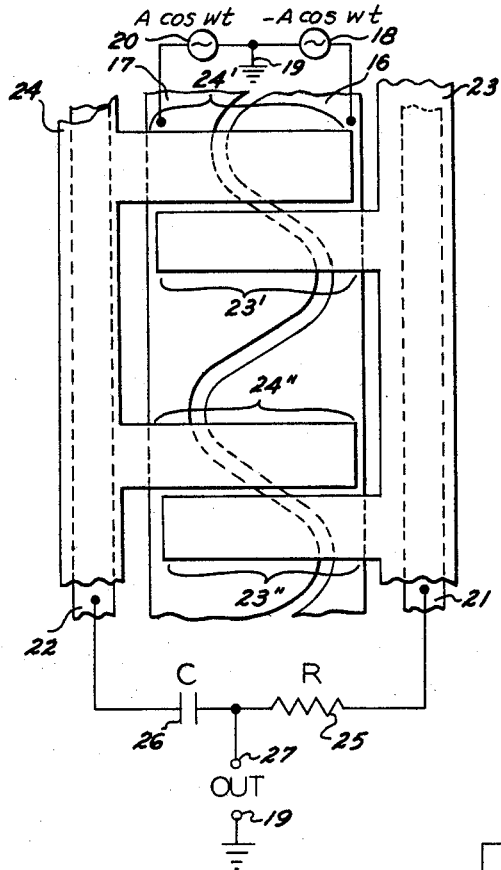
FIGURE 5 is a diagrammatic illustration of an alternative embodiment of the invention showing the relationship between the rotor and stator conductor patterns.

A complete phase-shifter system according to the present invention includes a number of cooperating elements each of which may be physically implemented by a variety of structural elements as determined by the nature of the position or displacement to be resolved, the degree of resolution required, the response rate required, the form of output required, and the operating environment imposed. For example, the apparatus may be of a form suitable for transducing a linear displacement to a phase shifted signal or may be of a form suitable for transducing a rotary displacement.

To clarify some of the terms used in the specification and claims, the following definitions are set forth:

Accuracy—the quality of correctness or freedom from error, and is distinguished from "precision" which refers to a measure of reproducibility and closeness to true value.

Pole pair—any two adjacent regions of pronounced electrostatic flux intensity having exactly the same strength but opposite polarity.

Resolver—a device for both transducing and breaking a vector quantity into parts.

Resolution—a measure of the smallness of an angle or linear distance which can be recognized.

There is shown in FIGURE 1 a simplified diagram illustrating the active elements of one form of phase-shifting transducer embodying the principles of the invention. The resolver elements themselves are substantially identical with those disclosed in the aforementioned Patent No. 3,068,457; however, the external input and output circuits differ substantially from the prior system since only a single pair of excitation generators are employed.

The apparatus comprises two sets of intermeshed sinusoidal conductor patterns 1—2 and 3—4. Each set comprises a continuous repeating series of pole pairs. There is located adjacent each set of sinusoidal patterns an output conductor pattern (5—8) which is used to supply the phase-shifted signal to the external utilizing circuits. Conductors 1—8 are supported on a dielectric base and may be applied thereto by photoetching, printed-circuit technique or similar methods. The dielectric support is relatively fixed. These conductors and their fixed support comprise the stator. Coupler bars 9 and 10 are located in a plane parallel to conductors 1—8, but are spaced apart from conductors 1—8 by a small gap. Coupler bars 9 and 10 are located on a dielectric support which is relatively movable with respect to fixed dielectric support carrying conductors 1—8; these elements comprise the rotor. It should be understood, however, that the apparatus need not be constructed in a rotary embodiment and that a rectilinear embodiment would employ elements analogous to a rotor and stator. A mechanical input to the transducer will result in a physical displacement of conductor bars 9—10 and will thereby provide a constant-amplitude signal whose phase varies as the mechanical input.

This apparatus is particularly useful where very small forces are available at the mechanical input. The apparatus has a further advantage because the physical mechanism involved in its action does not depend upon any physical property of materials. Therefore, a high degree of stability and reproducibility can be obtained.

An A.-C. carrier generator 11 supplies an excitation signal corresponding to $A \cos \omega t$ to conductors 2 and 4; a carrier excitation signal corresponding to $-A \cos \omega t$ is supplied to conductors 1—3 from generator 12. Generators 11 and 12 are referenced to ground 13.

There is shown in FIGURE 2 an equivalent circuit of the apparatus of FIGURE 1.

The phase shifter comprises a resolver which is dependent upon the electrostatic coupling across capacitances indicated by $C_1$ through $C_{12}$. These are equivalent capacitances, and it will be noted that capacitances $C_2$, $C_3$, $C_6$, and $C_7$ are variable (dependent upon mechanical input or displacement) while the remaining capacitances $C_1$, $C_4$, $C_5$, and $C_8$ through $C_{12}$ are substantially fixed capacitances. The electrical output is obtained between ground 13 and the junction 14 between resistor R and capacitor C. This provides a post pick-off phase shift of the output signal coupled to conductors 5–8 via bars 9 and 10. Examination will indicate that balanced conditions exist between various distributed and stray capacitance follows:

$$C_1 = C_4$$
$$C_5 = C_8$$
$$C_9 = C_{10}$$
$$C_{11} = C_{12}$$

These balanced conditions will result in the variable capacitances of $C_2$, $C_3$, $C_6$, and $C_7$ being the active variable elements which change as the coupler bars 9 and 10 are mechanically moved.

Looking now at FIGURE 3, there is shown a portion of the apparatus of FIGURE 1 in order to more clearly illustrate the relationships of the overlying conductor bars relative to the conjugate sinusoidal patterns of the stator.

The coupler pattern resembles two rows of alternate bars or spaces. The rows are separated and bordered by rings 5–8. The bars 9 and 10 may be contigous as shown in FIGURE 3. The widths of the bars 9—10 and spaces are the same and equal to half wave lengths of the sinusoidal patterns 1—2 and 3—4 on the stator. As the rotor moves relative to the stator, the first pair of conjugate sinusoidal areas 1—2 on the stator couples a voltage into the corresponding rectangular area 9 on the rotor which varies as a sine at the same time the second sinusoidal pattern on the stator, which is phase-displaced by 90 degrees from the first pattern, couples voltage into the corresponding rectangular area 10 on the rotor. Because of the zero and 180 degree phase displacement of the excitation voltages for the two sinusoidal pattern pairs, the output of the first rectangular area 9 is:

$$E \cos \theta$$

and the output of the second rectangular area 10 is:

$$jE \sin \theta$$

When these two signals are combined, the result is a signal of constant amplitude and rotating phase.

As can be seen, the phase of the output signal varies linearly with the rotor angle $\theta$. This phase shift increases constinuously from zero to 360 degrees as the two elements move relative to each other, a distance equal to one sinusoidal pattern or pole pair. The energy coupled from the electrostatic field from the sinusoidal patterns 1–4 and the conductors bars 9 and 10 will be recoupled into output conductor rings 5–8. It will be appreciated, however, that the point in space at which coupling takes place along the longitudinal axis of conductor patterns 1–4 will vary as a function of the mechanical input. It follows that the instant in time at which coupling occurs is concomitant with the point in space at which coupling occurs. For these reasons, the relative phase of the output signal will shift as a function of mechanical output whereas the amplitude of the output remains fixed.

The invention shown in FIGURE 1 differs from the apparatus disclosed in Patent No. 3,068,456, referred to hereinabove, in that only one pair of excitation generators is employed.

The post pick-off phase shift network comprised of resistance R and capacitance C may be employed to develop the desired quadrature relationship of the output signals, such that the form of the output intelligence is the same as that provided by the prior invention. A network of the type shown in FIGURE 4 is suitable for this purpose.

Figure 4:
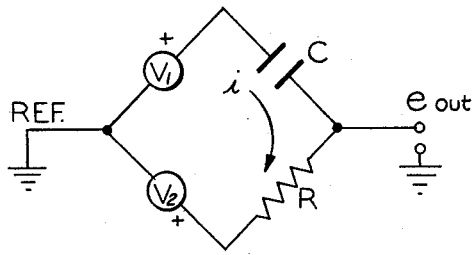
FIGURE 4 is a simplified equivalent circuit of the post-pickup phase shifting network.

In the network of FIGURE 4, the signal $V_1$ corresponds to the voltage obtained from one pair of sinusoidal patterns (e.g. 1 and 2 of FIGURE 1) and the signal $V_2$ corresponds to the voltage obtained from the remaining pair of sinusoidal patterns (e.g. 3 and 4). They may be represented as follows:

$$V_1 = KV \sin \theta$$
$$V_2 = KV \cos \theta$$

The derived signal output ($e_{out}$) from each source may be represented as follows:

$$e_{out} = iR + V_2$$

$$e_{out} = \frac{-i}{j\omega C} + V_1$$

Letting $$RC = \frac{1}{\omega}$$

and substituting for $V_1$ and $V_2$:

$$e_{out} = K\frac{(1+j)}{2}V\ (\sin\theta - j\cos\theta)$$

Letting $V = E\cos\omega t$, then:

$$e_{out} = \frac{KE}{\sqrt{2}}ej\left(\omega t + \theta - \frac{\pi}{4}\right)$$

Taking the real part of $e_{out}$:

$$e_{out} = \frac{KE}{\sqrt{2}}\cos\left(\omega t + \theta - \frac{\pi}{4}\right)$$

Thus, it can be seen that the phase of the output voltage ($e_{out}$) varies linearly with the rotor angle $\theta$.

Since the use of a post-pickoff phase shifting network allows the sine and cosine pattern pairs to be driven from two generators, supplying $A\cos\omega t$ and $-A\cos\omega t$, rather than the four generators required heretofore (for supplying two pairs of push pull A.-C. signals which have a quadrature time relationship), it now becomes feasible to reduce the number of pattern pairs from four to two. Accordingly, there is shown in FIGURE 5 a modification of the apparatus of FIGURE 1 in which only one pair of intermeshed sinusoidal driver patterns are employed.

The driver patterns comprise a pair of intermeshed sinusoidal conductors 16 and 17 which are physically carried on a relatively fixed dielectric substrate. Conductors 16 and 17 are separated from each other by a narrow insulating gap. Conductor 16 is driven from generator 18 which supplies an A.-C. excitation signal $-A\cos\omega t$ which is referenced to ground 19. Conductor 17 is driven from generator 20 which supplies an A.-C. excitation signal $A\cos\omega t$, also referenced to ground 19. Output conductor rings 21 and 22 are relatively fixed and carried on the same dielectric substrate as conductors 16 and 17. Rings 21 and 22 are separated from conductors 16 and 17 by a narrow insulating gap.

The relatively movable element (rotor) comprises a dielectric element which carries coupler conductors 23 and 24 which lie in a plane parallel to the plane of the driver conductors 16 and 17 and are spaced apart therefrom by a very small distance. The total area of any one extended finger-like portion of coupler conductor 23, overlying any given sinusoidal cycle of conductor patterns 16 and 17, corresponds to only one-half of a pole pair area. The remaining half of this pole pair area is covered by an adjacent extended finger-like portion of the other coupler conductor 24. Thus, the area conductor portion 23' and conductor portion 24', taken together, is the equivalent of one pole pair area. This arrangement is cyclically repeated so that each cycle of the sinusoidal driver conductors 16 and 17 is covered by a pair of coupler conductors, as indicated at 23" and 24".

The A.-C. signals supplied to driver conductors 16 and 17 are electrostatically coupled into coupler conductors 23 and 24, which in turn transfers the energy into output conductors 21 and 22. The phase of the signals in conductors 21 and 22, as compared with the excitation signals, is a function of the relative position of the rotor and stator. The phase-shifted output signals from conductors 21 and 22 are combined via a post-pickoff phase shifting network consisting of resistor 25 and capacitor 26. A single phase-shifted output signal appears between terminal 27 and ground 19.

Figure 6:
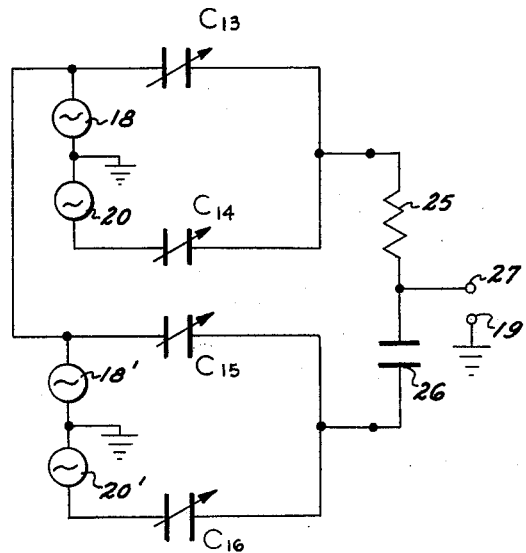
FIGURE 6 is an equivalent circuit diagram of the apparatus shown in FIGURE 5.

FIGURE 6 is a simplified equivalent circuit of the apparatus of FIGURE 5. The fixed capacitances corresponding to the coupling between the coupler conductors and the output rings have been omitted from this simplified equivalent circuit. The common terminals of capacitances C13 and C14 correspond to conductors 23' and 23", respectively. Similarly, the common terminals of capacitances C15 and C16 correspond to 24' and 24", respectively. Since the excitation signals supplied by generators 18 and 18' are identical, as are 20 and 20', the plates of the capacitances which they drive, may be considered as identical. Thus, conductor 16 serves as a plate for both capacitance C13 and capacitance C15. Similarly, conductor 17 serves as a plate for both capacitance C14 and C16.

The output voltage ($e_{out}$) appearing between terminals 19 and 27 is of the form:

$$e_{out} = KE\cos\left(\omega t + \theta + \frac{\pi}{2}\right)$$

As can be seen, the phase of the output voltage varies linearly with the rotor angle $\theta$ in substantially the same manner as described in this connection with the apparatus of FIGURE 1.

As will now be apparent, the structure shown in FIGURE 5 generates substantially the same type of output signal as the structure of FIGURE 1 yet requires only one-half the spatial area since only one pair of intermeshed sinusoidal conductors are required. This will permit a reduction in the overall size of the phase shifter and economy of manufacture.

While there have been shown and described and pointed out the fundamental novel features of the invention as applied to preferred embodiments, it will be understood that various omissions and substitutions and changes in the form and details of the devices illustrated and in their operation may be made by those skilled in the art, without departing from the spirit of the invention; therefore, it is intended that the invention be limited only as indicated by the scope of the following claims.

What is claimed is:

1. An electrostatic phase shifter comprising a pair of intermeshed sinusoidal conductors mounted on a relatively fixed dielectric substrate, a pair of output conductors adjacent corresponding ones of said sinusoidal conductors and mounted on said substrate, coupler conductors means parallel with and spaced apart from said sinusoidal conductors and said output conductors, said coupler conductors being carried on a relatively movable insulating member, a first source of alternating current connected to one of said sinusoidal conductors and a second source of alternating current connected to the other of said sinusoidal conductors, said second source being 180 degrees out of phase with said first source, and phase-shifting network means connected with said output conductors for combining the signal coupled thereto, to provide an output alternating current which is a function of the relative displacement between said substrate and said movable member.

2. Analog measuring apparatus comprising two relatively movable members, having planar faces, opposing each other across an air gap, one of said members carrying a pair of conjugate sinusoidal conductors and a pair of adjacent conductor rings, the other of said members carrying a plurality of opposing coupling conductor means overlying successive pole pairs of said sinusoidal conductors and at least a portion of the adjacent conductor rings, first and second sources of high frequency electrical energy, said first source being connected to one of said sinusoidal conductors and said second source being 180 degrees out of phase with said first source and connected to the other of said sinusoidal conductors, and a resistive-capacitive phase-shifting network connected to said conductor rings for providing an output signal whose phase is a function of the relative position of said movable members.

3. Analog measuring apparatus as defined in claim 2 wherein said coupling conductor means comprises first and second electrodes having a number of interlaced finger areas, the combined area of which substantially corresponds to the combined area of said pole pairs.

4. An electrostatic phase shifter having two pairs of input conductors, each pair having enmeshed contoured edges, an input terminal on each contoured conductor, at least one output conductor extending along each pair of contoured conductors, an output terminal on each output conductor for supplying a single phase constant amplitude voltage, a first alternating current voltage source connected to one of the input terminals of each pair of contoured conductors and a second alternating current voltage source connected to the other ones of the input terminals of the pairs, said first alternating current source providing a signal which is displaced 180 electrical degrees from the signal from said second alternating current source, a movable member opposed to all of the conductors for effecting a phase shift in the conductors and a three-terminal phase shifting network having two terminals, one each connected to said output terminals and providing an output voltage at the remaining terminal, the phase of which is linearly proportional to the displacement of said phase shifter member.

5. In an electrostatic phase shifter as defined in claim 4 wherein said network comprises a series resistance and capacitance, one terminal of said resistance being connected to said one terminal of said pair of output terminals, said capacitance being connected to the other terminal of said pair of output terminals and said remaining terminal of said network being connected to the juncture between said resistance and said capacitance, the said terminal, through a load, being electrically connected to the junction of the two generators.

6. In an electrostatic phase shifter, a pair of relatively movable members, a pair of driver conducting means and an associated output conductor along one of said members, said driver conducting means having a cyclic pattern along its length, a second like pair of driven conducting means and associated output conductor, first and second sources of high frequency electrical energy connected to said driver conducting means of each pair, said second source being 180 degrees out of phase with said first source, coupler conducting means mounted on the other of said members for movement relative to said driver conducting means and said output conductors and comprising a plurality of elements electrostatically coupled to said driver conducting means and said output conductors by having a substantially constant area of exposure to said driver conducting means, and a phase-shifting network connected between said output conductors to provide an output signal of substantially constant amplitude whose phase is shifted by an amount proportional to mechanical displacement of said movable member.

References Cited in the file of this patent
UNITED STATES PATENTS

| | | |
|---|---|---|
| 2,147,728 | Wintringham | Feb. 21, 1939 |
| 2,379,221 | Espenshied | June 26, 1945 |
| 2,422,204 | Meacham | June 17, 1947 |
| 2,454,426 | Beckwith | Nov. 23, 1948 |
| 2,527,215 | Hahn | Oct. 24, 1950 |
| 3,017,574 | Redfern | Jan. 16, 1962 |
| 3,068,457 | Nevius | Dec. 11, 1962 |